(12) United States Patent
Kazmer et al.

(10) Patent No.: US 6,343,921 B1
(45) Date of Patent: Feb. 5, 2002

(54) MANIFOLD SYSTEM HAVING FLOW CONTROL USING SEPARATE CAVITIES

(75) Inventors: David Kazmer, Amherst; Mark D. Moss, Boxford, both of MA (US)

(73) Assignee: Synventive Molding Solutions, Peabody, MA (US)

( * ) Notice: Subject to any disclaimer, the term of this patent is extended or adjusted under 35 U.S.C. 154(b) by 0 days.

(21) Appl. No.: 09/477,931

(22) Filed: Jan. 5, 2000

Related U.S. Application Data

(62) Division of application No. 09/063,762, filed on Apr. 21, 1998.

(51) Int. Cl.[7] .................................................. B29C 45/77
(52) U.S. Cl. ...................... 425/145; 264/40.5; 425/562; 425/564; 425/572
(58) Field of Search ............................... 264/40.1, 40.5, 264/328.8; 425/145, 149, 562, 564, 567, 568, 570, 572, 577, 588, DIG. 224, DIG. 225

(56) References Cited

U.S. PATENT DOCUMENTS

| | | |
|---|---|---|
| 3,535,742 A | 10/1970 | Marcus |
| 3,780,764 A | 12/1973 | Geist |
| 3,820,928 A | 6/1974 | Lemelson |
| 3,861,841 A | 1/1975 | Hanning |
| 3,952,927 A | 4/1976 | Schaumburg et al. |
| 4,389,002 A | 6/1983 | Devellian et al. |
| 4,521,179 A | 6/1985 | Gellert |
| 4,588,367 A | 5/1986 | Schad |

(List continued on next page.)

FOREIGN PATENT DOCUMENTS

| | | |
|---|---|---|
| DE | 2034163 | 11/1971 |
| DE | 2401168 | 7/1975 |
| DE | 299 09 535 U 1 | 8/1999 |
| JP | 58 142833 | 8/1983 |
| JP | 60-212321 | 10/1985 |
| JP | 61-63428 | 1/1986 |
| WO | WO 97/43105 | 11/1997 |
| WO | 98/56564 | 12/1998 |

(List continued on next page.)

OTHER PUBLICATIONS

Abstract—Japanese Publication No. 2000141439, May 23, 2000, Kobe Steel Ltd., "Injection Compression Molding Device".

Patent Abstracts of Japan, Publication No. 63166511, Date of Publication: Sep. 7, 1988, Applicant: Nissei Plastics Ind. Co., Inventor: Takayama Kazutoshi, Title: Injection Molding.

Patent Abstracts of Japan, Publication No.: 61–63428, Date of Publication: Jan. 4, 1986, Applicant: Nippon Denso Co. Ltd, Inventor: Koyama, Title: Mold Assembly.

International Search Report from International Application No. PCT/US 98/10798, filed May 27, 1998.

(List continued on next page.)

*Primary Examiner*—Tim Heitbrink
(74) *Attorney, Agent, or Firm*—Finnegan, Henderson, Farabow, Garrett & Dunner, L.L.P.

(57) ABSTRACT

An injection molding apparatus is provided in which the rate of material flow during an injection cycle is controlled. According to one preferred embodiment, an injection molding system is provided that includes a manifold adapted to receive material injected from an injection molding machine and distribute the material to a plurality of channels, a plurality of injection molding nozzles coupled to the manifold, each injection molding nozzle having a bore for passing material from one of said channels of the manifold to a respective gate of a respective separate mold cavity, and a controller to individually control respective rates at which material flows into each separate mold cavity during an injection cycle.

16 Claims, 12 Drawing Sheets

U.S. PATENT DOCUMENTS

| | | |
|---|---|---|
| 4,592,711 A | 6/1986 | Capy |
| 4,863,369 A | 9/1989 | Schad et al. |
| 4,932,854 A | 6/1990 | Matsuda et al. |
| 5,078,589 A | 1/1992 | Osuna-Diaz |
| 5,141,696 A | 8/1992 | Osuna-Diaz |
| 5,149,547 A * | 9/1992 | Gill .............................. 425/145 |
| 5,356,576 A | 10/1994 | Fischbach |
| 5,389,315 A | 2/1995 | Yabushita |
| 5,492,467 A | 2/1996 | Hume et al. |
| 5,545,028 A | 8/1996 | Hume et al. |
| 5,554,395 A | 9/1996 | Hume et al. |
| 5,556,582 A | 9/1996 | Kazmer |
| 5,674,439 A | 10/1997 | Hume et al. |
| 5,871,786 A | 2/1999 | Hume et al. |
| 5,885,628 A | 3/1999 | Swenson et al. |
| 5,894,025 A | 4/1999 | Lee et al. |
| 5,916,605 A | 6/1999 | Swenson et al. |
| 5,948,448 A | 9/1999 | Schmidt |
| 5,948,450 A | 9/1999 | Swenson et al. |
| 5,980,237 A | 11/1999 | Swenson et al. |
| 6,000,831 A | 12/1999 | Triplett |
| 6,027,328 A | 2/2000 | Herbst |
| 6,254,377 B1 | 7/2001 | Kazmer et al. |

FOREIGN PATENT DOCUMENTS

| | | |
|---|---|---|
| WO | WO 99/54109 | 10/1999 |
| WO | 99/54109 | 10/1999 |
| WO | WO99/59795 | 11/1999 |
| WO | 01/08462 | 2/2001 |

OTHER PUBLICATIONS

Translation for Japanese Unexamined Patent Application No. 61–63428, Date of Publication: Jan. 4, 1986, Applicant: NEC, Inventor: Hiroshi Koyama, Title: Mold Apparatus.

"Multi–Cavity Pressure Control in the Filling and Packing Stages of the Injection Molding Process"
D. Kazmer and P. Barkan, Polymer Engineering and Science, 11/1997, vol. 37, No. 11, pp. 1865–1879.

"The Process Capability of Multi–Cavity Pressure Control for the Injection Molding Process",
D. Kazmer and P. Barkan, Polymer Engineering and Science, 11/1997, vol. 37, No. 11, pp. 1880–1895.

"Dynamic Feed Control: A New Method for Injection Molding of High Quality Plastic Parts",
D. Kazmer, Jun. 1995, a dissertation submitted to the Design Division of Mechanical Engineering and The Committee on Graduate Studies in Partial Fulfillment of the Requirements for the Degree of Doctor of Philosophy in Mechanical Engineering.

* cited by examiner

MANIFOLD SYSTEM HAVING FLOW CONTROL USING SEPARATE CAVITIES

This application is a divisional of application Ser. No. 09/063,762, filed Apr. 21, 1998, entitled MANIFOLD SYSTEM HAVING FLOW CONTROL, and now Pending.

FIELD OF THE INVENTION

This invention relates to injection of pressurized materials through a manifold, such as injection molding of plastic melt in a hot runner system. More specifically, this invention relates to an improved injection molding hot runner system in which the rate of melt flow is controlled through the gate during an injection molding cycle.

DESCRIPTION OF THE RELATED ART

U.S. Pat. No. 5,556,582 discloses a multi-gate single cavity system in which the rate of melt flow through the individual gates is controlled independently via a control system according to specific target process conditions. This system enables the weld line of the part (the section of the part in which the melt from one gate meets the melt from another gate) to be selectively located. It also enables the shape of the weld line to be altered to form a stronger bond.

The '582 patent discloses controlling the rate of melt flow with a tapered valve pin at the gate to the mold cavity. It also discloses placing a pressure transducer inside the mold cavity. Placing the pressure transducer inside the mold cavity can result in the pressure transducer sensing pressure spikes which can occur when the valve pin is closed. A pressure spike sensed by the transducer can cause an unintended response from the control system, and result in a less precise control of the melt flow than desired.

The control system disclosed in the '582 patent uses the variables of valve pin position and cavity pressure to determine what position the valve pin should be in. Thus, the algorithm performed by the control system in the '582 patent utilizes two variables to control the rate of melt flow into the cavity.

SUMMARY OF THE INVENTION

An injection molding apparatus is provided in which the rate of material flow during the injection cycle is controlled. According to one preferred embodiment, an injection molding system is provided that includes a manifold adapted to receive material injected from an injection molding machine and distribute the material to a plurality of channels, a plurality of injection molding nozzles coupled to the manifold, each injection molding nozzle having a bore for passing material from one of said channels of the manifold to a respective gate of a respective separate mold cavity, and a controller to individually control respective rates at which material flows into each separate mold cavity during an injection cycle.

DETAILED DESCRIPTION

Figure 1:
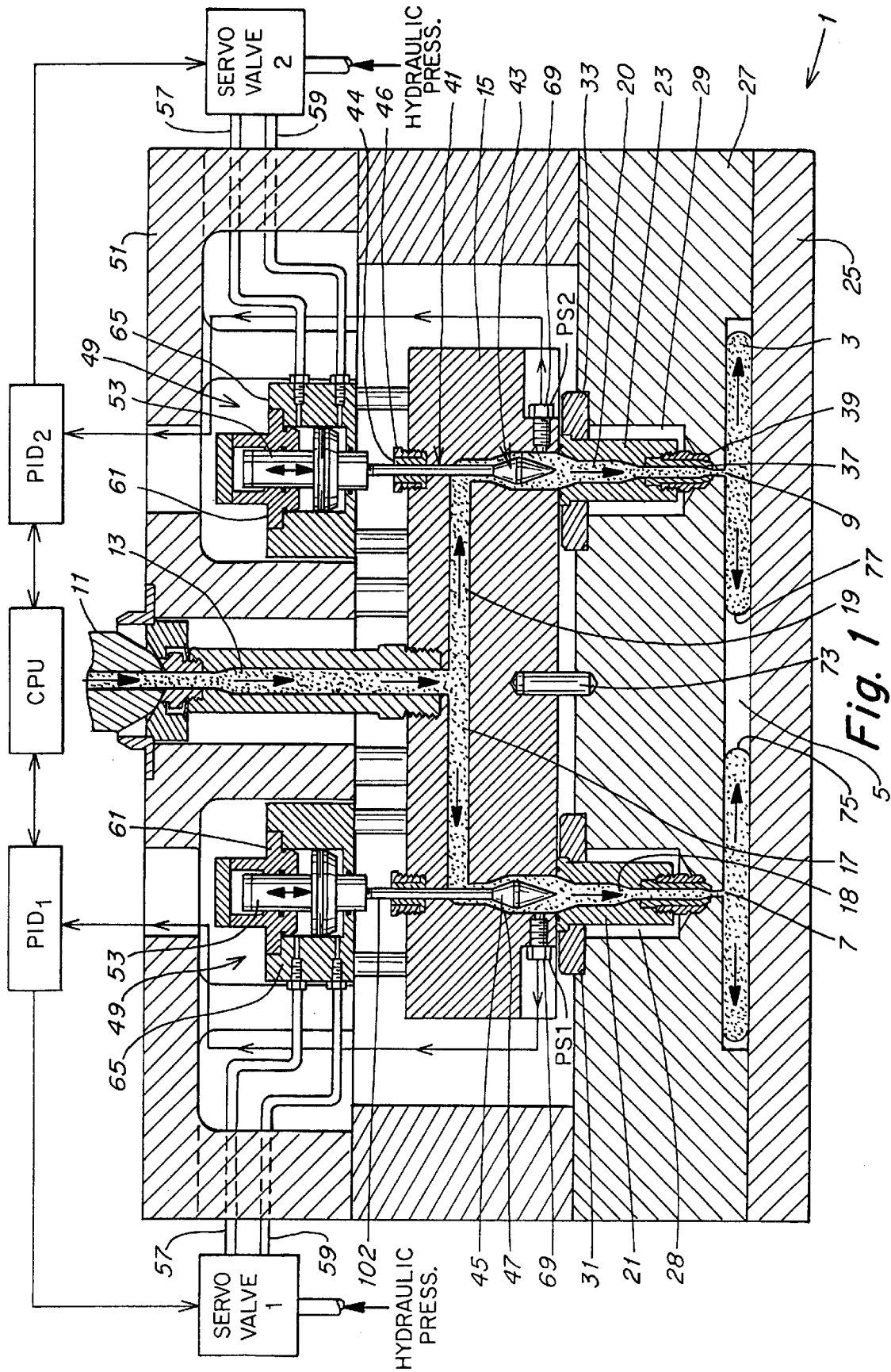
FIG. 1 is a partially schematic cross-sectional view of an injection molding system according to one embodiment of the present invention.
Figure 2:
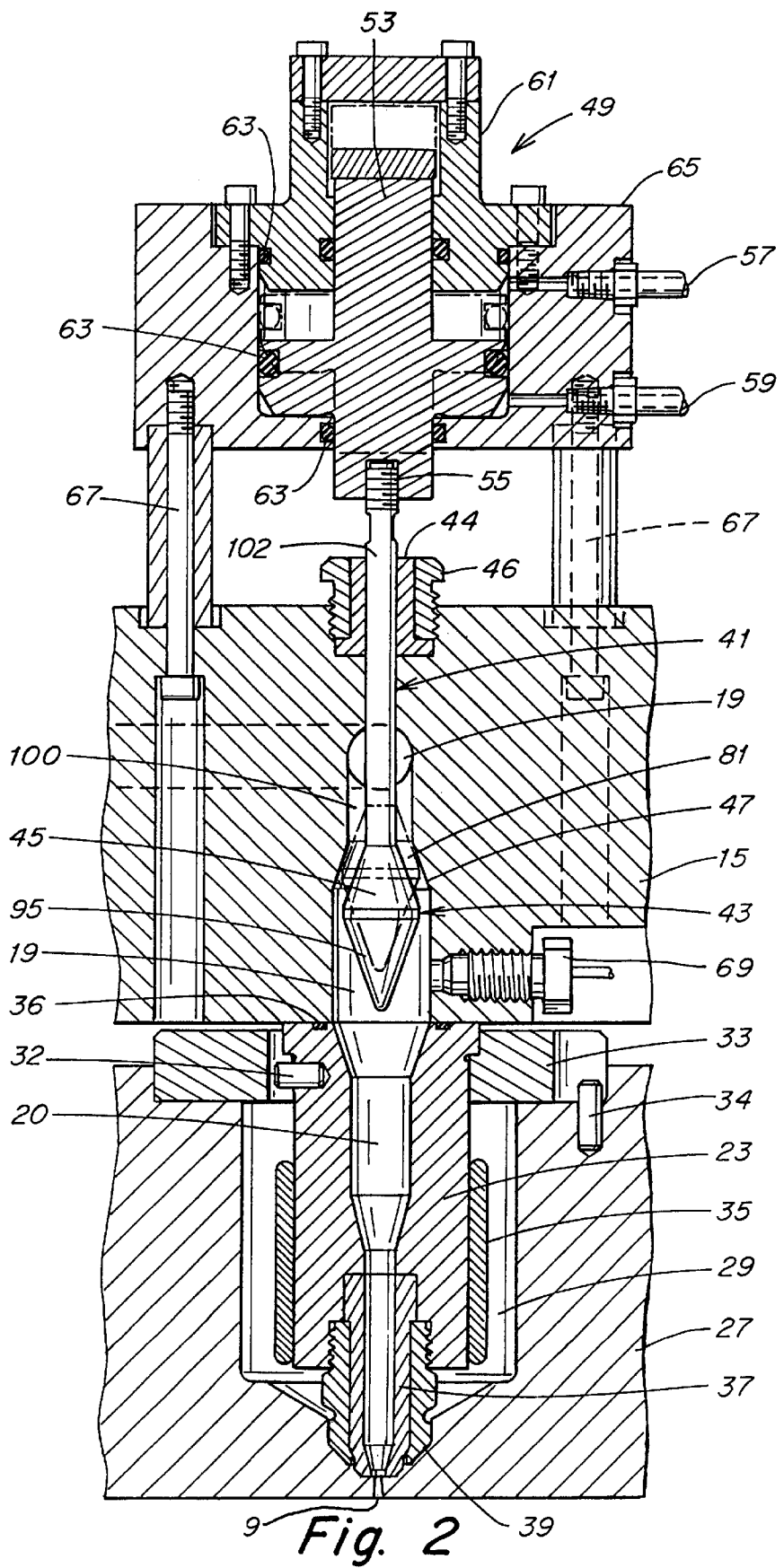
FIG. 2 is an enlarged fragmentary cross-sectional view of one side of the injection molding system of FIG. 1.

FIGS. 1–2 show one embodiment of the injection molding system according to the present invention. The injection molding system 1 is a multi-gate single cavity system in which melt material 3 is injected into a cavity 5 from gates 7 and 9. Melt material 3 is injected from an injection molding machine 11 through an extended inlet 13 and into a manifold 15. Manifold 15 distributes the melt through channels 17 and 19. Although a hot runner system is shown in which plastic melt is injected, the invention is applicable to other types of injection systems in which it is useful to control the rate at which a material (e.g., metallic or composite materials) is delivered to a cavity.

Melt is distributed by the manifold through channels 17 and 19 and into bores 18 and 20 of nozzles 21 and 23, respectively. Melt is injected out of nozzles 21 and 23 and into cavity 5 (where the part is formed) which is formed by mold plates 25 and 27. Although a multi-gate single-cavity system is shown, the invention is not limited to this type of system, and is also applicable to, for example, multi-cavity systems, as discussed in greater detail below.

The injection nozzles 21 and 23 are received in respective wells 28 and 29 formed in the mold plate 27. The nozzles 21 and 23 are each seated in support rings 31 and 33. The support rings serve to align the nozzles with the gates 7 and 9 and insulate the nozzles from the mold. The manifold 15 sits atop the rear end of the nozzles and maintains sealing contact with the nozzles via compression forces exerted on the assembly by clamps (not shown) of the injection molding machine. An O-ring 36 is provided to prevent melt leakage between the nozzles and the manifold. A dowel 73 centers the manifold on the mold plate 27. Dowels 32 and 34 prevent the nozzle 23 and support ring 33, respectively, from rotating with respect to the mold 27.

The nozzles also include a heater 35 (FIG. 2). Although an electric band heater is shown, other heaters may be used. Furthermore, heat pipes (for example those disclosed in U.S. Pat. No. 4,389,002) may be disposed in each nozzle and used alone or in conjunction with heater 35. The heater is used to maintain the melt material at its processing temperature up to the gates 7 and 9. The nozzles 21 and 23 also include an insert 37 and a tip 39. The insert can be made of a material (for example beryllium copper) having high thermal conductivity in order to maintain the melt at its processing temperature up to the gate by imparting heat to the melt from the heater 35. The tip 39 is used to form a seal with the mold plate 27 and is preferably a material (for example titanium alloy or stainless steel) having low thermal conductivity so as to reduce heat transfer from the nozzle to the mold.

A valve pin 41 having a head 43 is used to control the rate of flow of the melt material to the respective gates 7 and 9. The valve pin reciprocates through the manifold. A valve pin bushing 44 is provided to prevent melt from leaking along stem 102 of the valve pin. The valve pin bushing is held in place by a threadably mounted cap 46. The valve pin is opened at the beginning of the injection cycle and closed at the end of the cycle. During the cycle, the valve pin can assume intermediate positions between the fully open and closed positions, in order to decrease or increase the rate of flow of the melt. The head includes a tapered portion 45 that forms a gap 81 with a surface 47 of the bore 19 of the manifold. Increasing or decreasing the size of the gap by displacing the valve pin correspondingly increases or decreases the flow of melt material to the gate. When the valve pin is closed the tapered portion 45 of the valve pin head contacts and seals with the surface 47 of the bore of the manifold.

FIG. 2 shows the head of the valve pin in a Phantom dashed line in the closed position and a solid line in the fully opened position in which the melt is permitted to flow at a maximum rate. To reduce the flow of melt, the pin is retracted away from the gate by an actuator 49, to thereby decrease the width of the gap 81 between the valve pin and the bore 19 of the manifold.

The actuator 49 (for example, the type disclosed in application Ser. No. 08/874,962) is mounted in a clamp plate 51 which covers the injection molding system 1. The actuator 49 is a hydraulic actuator, however, pneumatic or electronic actuators can be used. The actuator 49 includes a hydraulic circuit that includes a movable piston 53 in which the valve pin 41 is threadably mounted at 55. Thus, as the piston 53 moves, the valve pin 41 moves with it. The actuator 49 includes hydraulic lines 57 and 59 which are controlled by servo valves 1 and 2. Hydraulic line 57 is energized to move the valve pin 41 toward the gate to the open position, and hydraulic line 59 is energized to retract the valve pin away from the gate toward the close position. An actuator cap 61 limits longitudinal movement in the vertical direction of the piston 53. O-rings 63 provide respective seals to prevent hydraulic fluid from leaking out of the actuator. The actuator body 65 is mounted to the manifold via screws 67.

A pressure transducer 69 is used to sense the pressure in the manifold bore 19 downstream of the valve pin head 43. In operation, the conditions sensed by the pressure transducer 69 associated with each nozzle are fed back to a control system that includes controllers PID 1 and PID 2 and a CPU shown schematically in FIG. 1. The CPU executes a PID (proportional, integral, derivative) algorithm which compares the sensed pressure (at a given time) from the pressure transducer to a programmed target pressure (for the given time). The CPU instructs the PID controller to adjust the valve pin using the actuator 49 in order to mirror the target pressure for that given time. In this way a programmed target pressure profile for an injection cycle for a particular part for each gate 7 and 9 can be followed.

Although in the disclosed embodiment the sensed condition is pressure, other sensed conditions can be used which relate to melt flow rate. For example, the position of the valve pin or the load on the valve pin could be the sensed condition. If so, a position sensor or load sensor, respectively, could be used to feed back the sensed condition to the PID controller. In the same manner as explained above, the CPU would use a PID algorithm to compare the sensed condition to a programmed target position profile or load profile for the particular gate to the mold cavity, and adjust the valve pin accordingly.

Melt flow rate is directly related to the pressure sensed in bore 19. Thus, using the controllers PID 1 and PID 2, the rate at which the melt flows into the gates 7 and 9 can be adjusted during a given injection molding cycle, according to the desired pressure profile. The pressure (and rate of melt flow) is decreased by retracting the valve pin and decreasing the width of the gap 81 between the valve pin and the manifold bore, while the pressure (and rate of melt flow) is increased by displacing the valve pin toward the gate 9, and increasing the width of the gap 81. The PID controllers adjust the position of the actuator piston 51 by sending instructions to servo valves 1 and 2.

By controlling the pressure in a single cavity system (as shown in FIG. 1) it is possible to adjust the location and shape of the weld line formed when melt flow 75 from gate 7 meets melt flow 77 from gate 9 as disclosed in U.S. Pat. No. 5,556,582. However, the invention also is useful in a multi-cavity system. In a multi-cavity system the invention can be used to balance fill rates and packing profiles in the respective cavities. This is useful, for example, when molding a plurality of like parts in different cavities. In such a system, to achieve a uniformity in the parts, the fill rates and packing profiles of the cavities should be as close to identical as possible. Using the same programmed pressure profile for each nozzle, unpredictable fill rate variations from cavity to cavity are overcome, and consistently uniform parts are produced from each cavity.

Another advantage of the present invention is seen in a multi-cavity system in which the nozzles are injecting into cavities which form different sized parts that require different fill rates and packing profiles. In this case, different pressure profiles can be programmed for each respective controller of each respective cavity. Still another advantage is when the size of the cavity is constantly changing, i.e., when making different size parts by changing a mold insert in which the part is formed. Rather than change the hardware (e.g., the nozzle) involved in order to change the fill rate and packing profile for the new part, a new program is chosen by the user corresponding to the new part to be formed.

The embodiment of FIGS. 1 and 2 has the advantage of controlling the rate of melt flow away from the gate inside manifold 15 rather than at the gates 7 and 9. Controlling the melt flow away from the gate enables the pressure transducer to be located away from the gate (in FIGS. 1–5). In this way, the pressure transducer does not have to be placed inside the mold cavity, and is not susceptible to pressure spikes which can occur when the pressure transducer is located in the mold cavity or near the gate. Pressure spikes in the mold cavity result from the valve pin being closed at the gate. This pressure spike could cause an unintended response from the control system, for example, an opening of the valve pin to reduce the pressure—when the valve pin should be closed.

Avoidance of the effects of a pressure spike resulting from closing the gate to the mold makes the control system behave more accurately and predictably. Controlling flow away from the gate enables accurate control using only a single sensed condition (e.g., pressure) as a variable. The '582 patent disclosed the use of two sensed conditions (valve position and pressure) to compensate for an unintended response from the pressure spike. Sensing two conditions resulted in a more complex control algorithm (which used two variables) and more complicated hardware (pressure and position sensors).

Another advantage of controlling the melt flow away from the gate is the use of a larger valve pin head 43 than would be used if the valve pin closed at the gate. A larger valve pin head can be used because it is disposed in the manifold in which the melt flow bore 19 can be made larger to accommodate the larger valve pin head. It is generally undesirable to accommodate a large size valve pin head in the gate area within the end of the nozzle 23, tip 39 and insert 37. This is because the increased size of the nozzle, tip and insert in the gate area could interfere with the construction of the mold, for example, the placement of water lines within the mold which are preferably located close to the gate. Thus, a larger valve pin head can be accommodated away from the gate.

Figure 3:
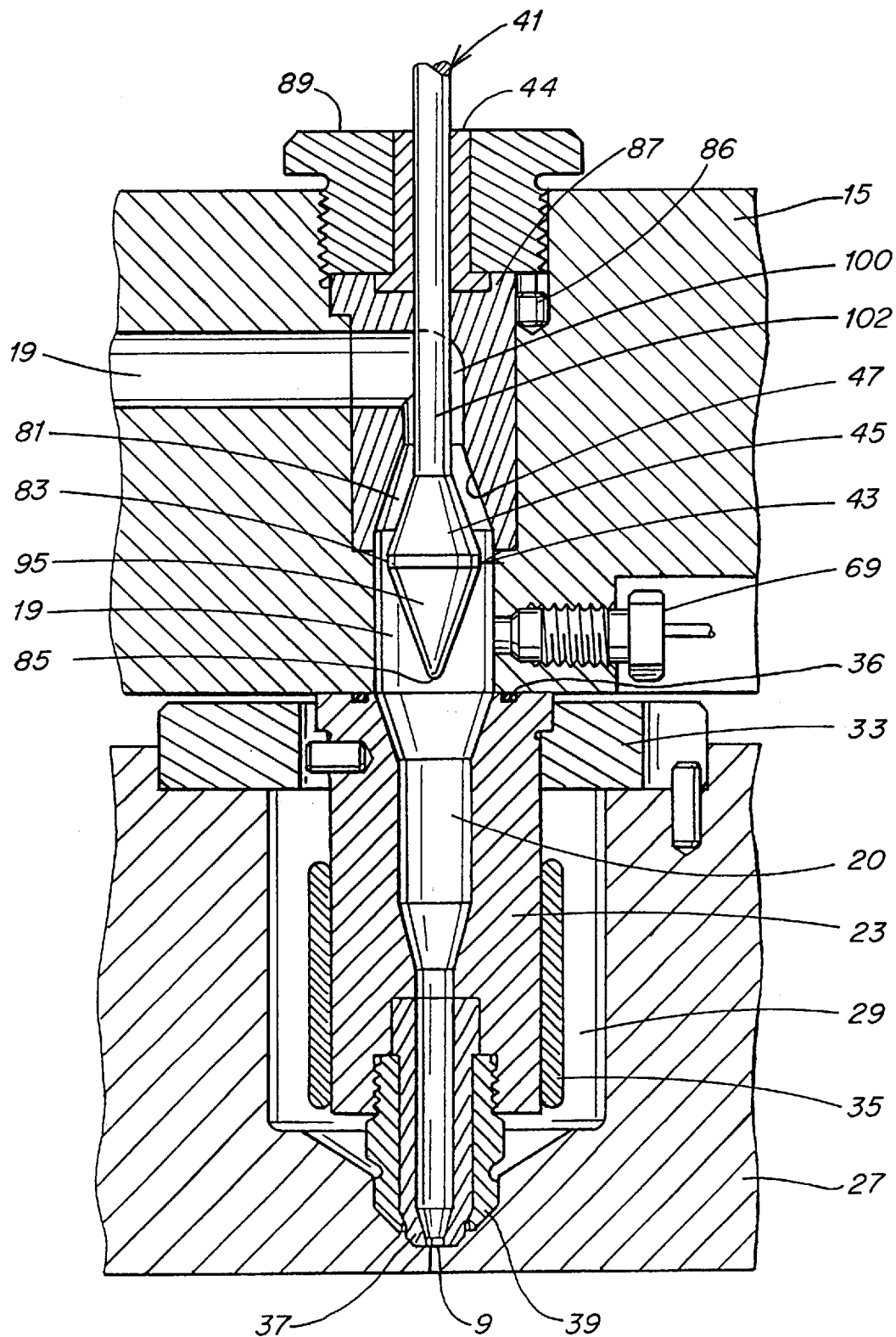
FIG. 3 is an enlarged fragmentary cross-sectional view of an alternative embodiment of a system similar to FIG. 1, in which a plug is used for easy removal of the valve pin.

The use of a larger valve pin head enables the use of a larger surface 45 on the valve pin head and a larger surface 47 on the bore to form the control gap 81. The more "control" surface (45 and 47) and the longer the "control" gap (81)—the more precise control of the melt flow rate and pressure can be obtained because the rate of change of melt flow per movement of the valve pin is less. In FIGS. 1–3 the size of the gap and the rate of melt flow is adjusted by adjusting the width of the gap, however, adjusting the size of the gap and the rate of material flow can also be accomplished by changing the length of the gap, i.e., the longer the gap the more flow is restricted. Thus, changing the size of the gap and controlling the rate of material flow can be accomplished by changing the length or width of the gap.

The valve pin head includes a middle section 83 and a forward cone shaped section 95 which tapers from the middle section to a point 85. This shape assists in facilitating uniform melt flow when the melt flows past the control gap 81. The shape of the valve pin also helps eliminates dead spots in the melt flow downstream of the gap 81.

FIG. 3 shows another aspect in which a plug 87 is inserted in the manifold 15 and held in place by a cap 89. A dowel 86 keeps the plug from rotating in the recess of the manifold that the plug is mounted. The plug enables easy removal of the valve pin 41 without disassembling the manifold, nozzles and mold. When the plug is removed from the manifold, the valve pin can be pulled out of the manifold where the plug was seated since the diameter of the recess in the manifold that the plug was in is greater than the diameter of the valve pin head at its widest point. Thus, the valve pin can be easily replaced without significant downtime.

Figure 4:
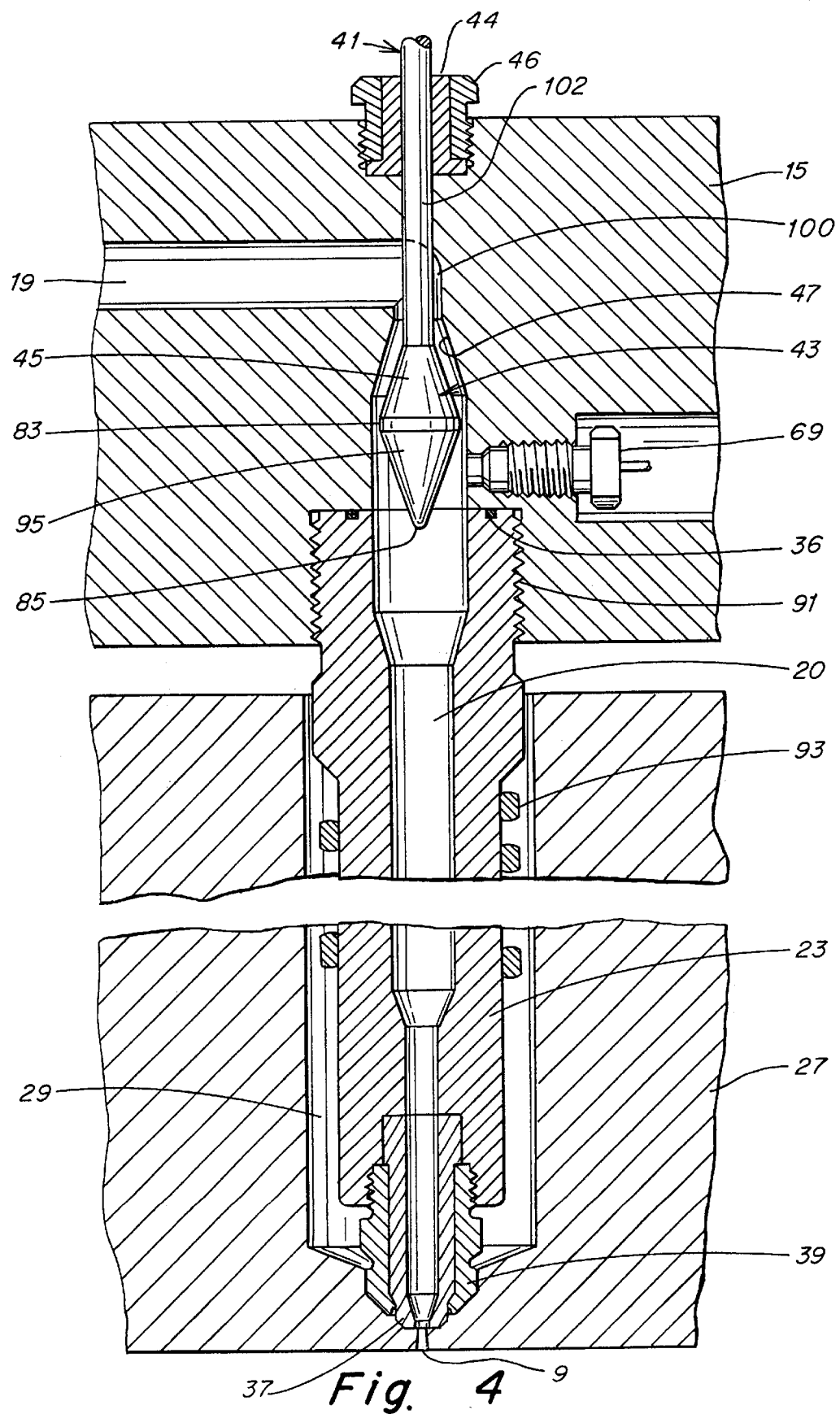
FIG. 4 is an enlarged fragmentary cross-sectional view of an alternative embodiment of a system similar to FIG. 1, in which a threaded nozzle is used.
Figure 5:
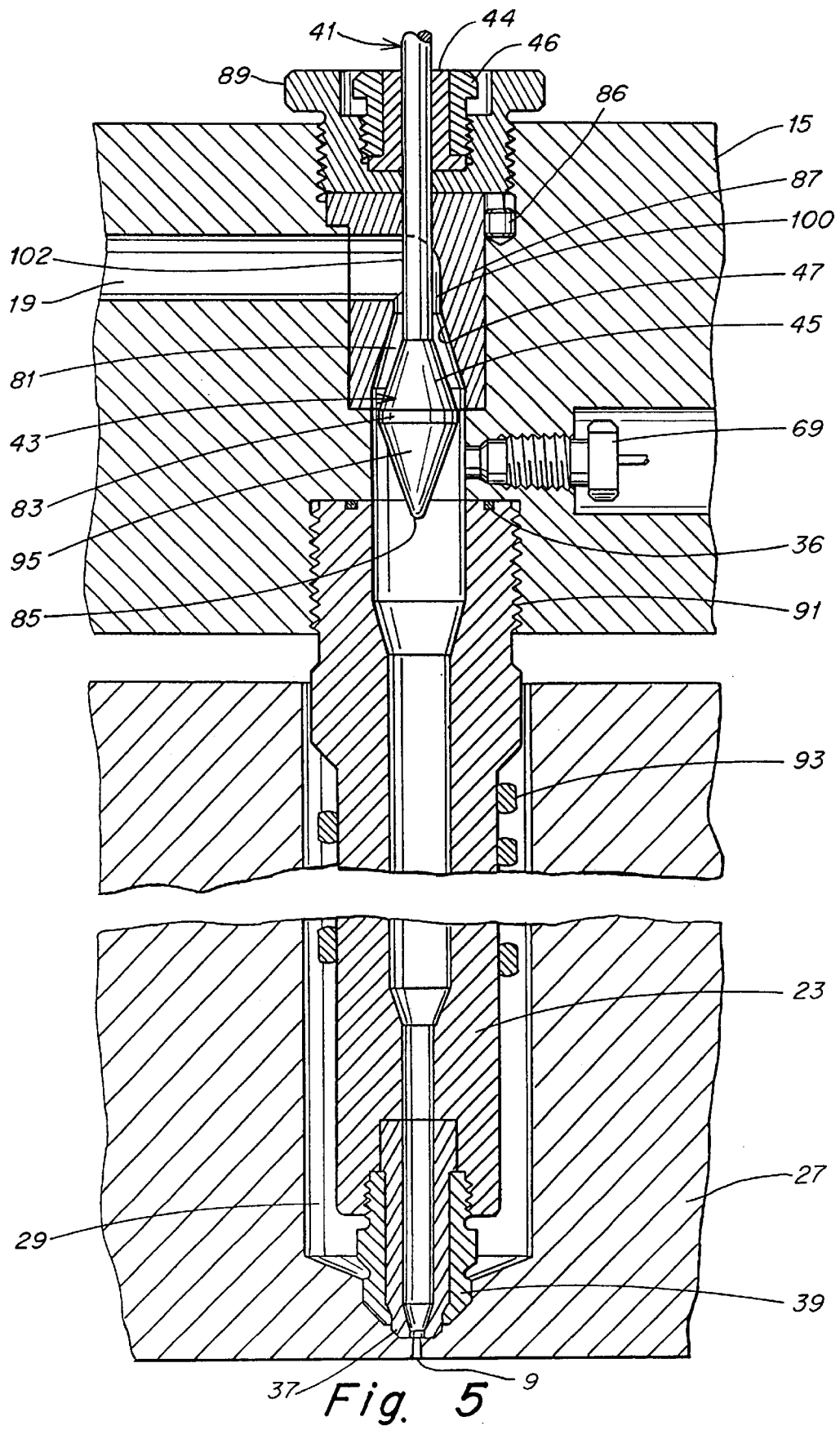
FIG. 5 is a view similar to FIG. 4, showing an alternative embodiment in which a plug is used for easy removal of the valve pin.

FIGS. 4 and 5 show additional alternative embodiments of the invention in which a threaded nozzle style is used instead of a support ring nozzle style. In the threaded nozzle style, the nozzle 23 is threaded directly into manifold 15 via threads 91. Also, a coil heater 93 is used instead of the band heater shown in FIGS. 1–3. The threaded nozzle style is advantageous in that it permits removal of the manifold and nozzles (21 and 23) as a unitary element. There is also less of a possibility of melt leakage where the nozzle is threaded on the manifold. The support ring style (FIGS. 1–3) is advantageous in that one does not need to wait for the manifold to cool in order to separate the manifold from the nozzles. FIG. 5 also shows the use of the plug 87 for convenient removal of valve pin 41.

Figure 6:
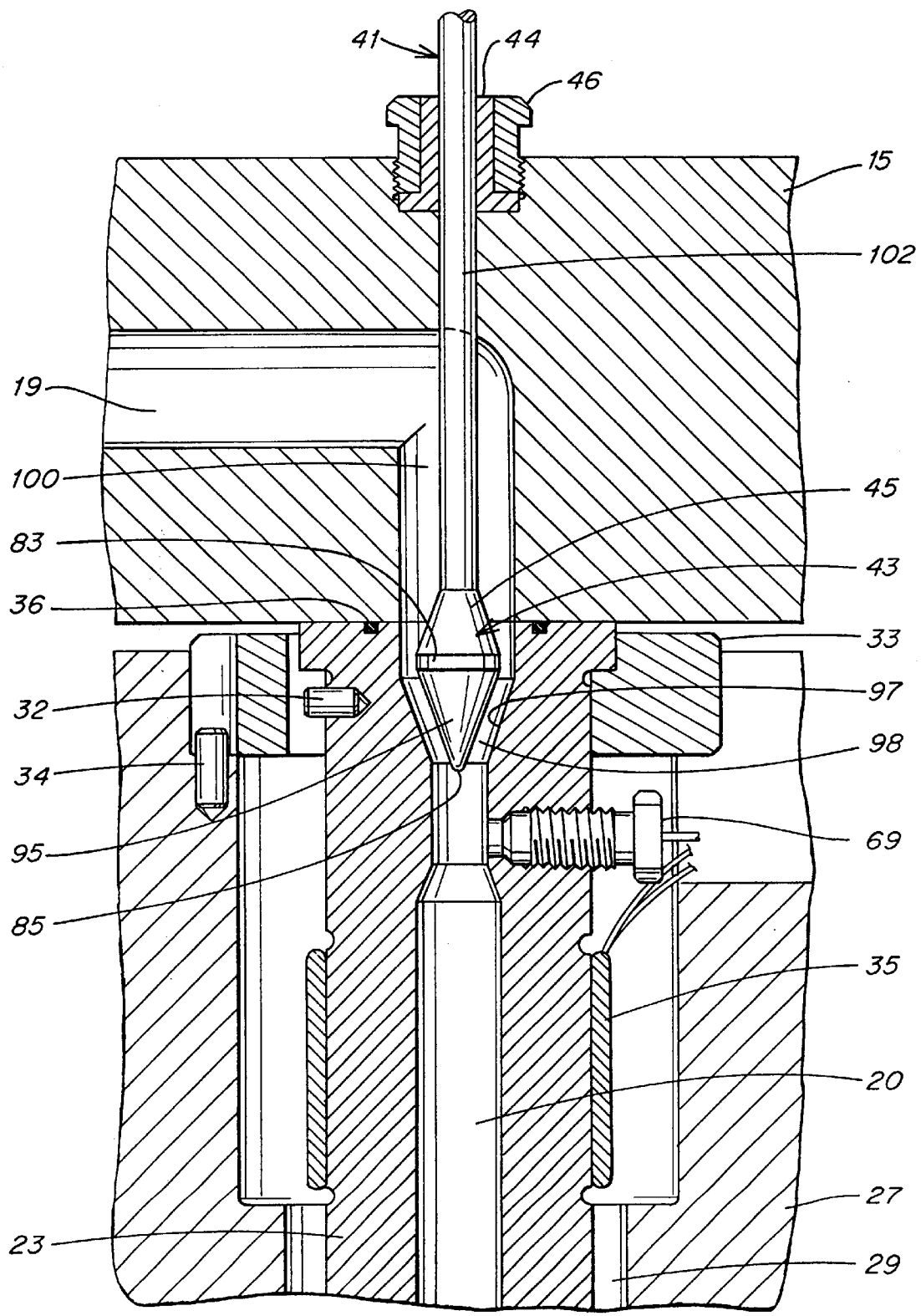
FIG. 6 shows a fragmentary cross-sectional view of a system similar to FIG. 1, showing an alternative embodiment in which a forward shut-off is used.
Figure 7:
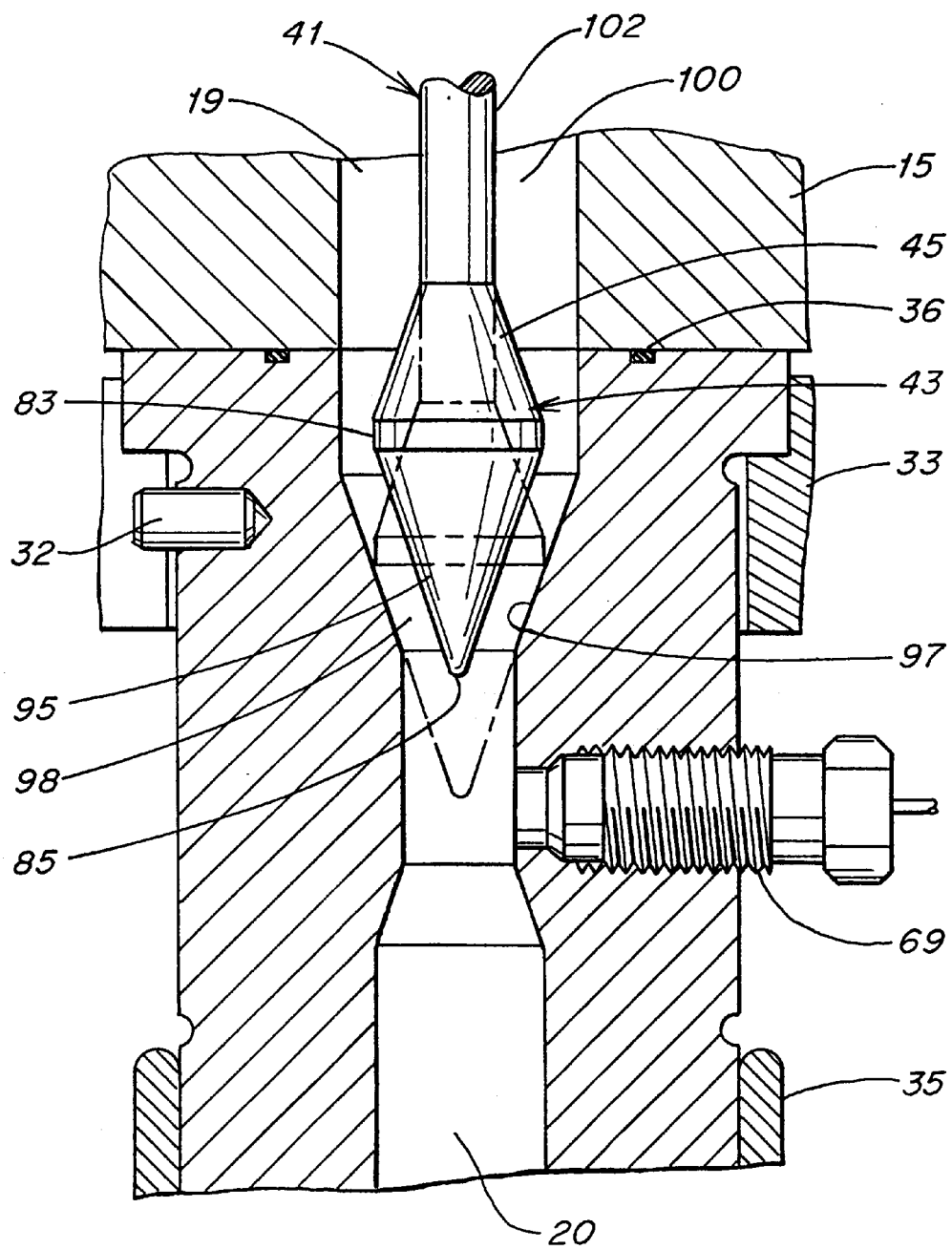
FIG. 7 shows an enlarged fragmentary view of the embodiment of FIG. 6, showing the valve pin in the open and closed positions, respectively.

FIGS. 6–10 show an alternative embodiment of the invention in which a "forward" shutoff is used rather than a retracted shutoff as shown in FIGS. 1–5. In the embodiment of FIGS. 6 and 7, the forward cone-shaped tapered portion 95 of the valve pin head 43 is used to control the flow of melt with surface 97 of the inner bore 20 of nozzle 23. An advantage of this arrangement is that the valve pin stem 102 does not restrict the flow of melt as in FIGS. 1–5. As seen in FIGS. 1–5, the clearance 100 between the stem 102 and the bore 19 of the manifold is not as great as the clearance 100 in FIGS. 6 and 7. The increased clearance 100 in FIGS. 6–7 results in a lesser pressure drop and less shear on the plastic.

In FIGS. 6 and 7 the control gap 98 is formed by the front cone-shaped portion 95 and the surface 97 of the bore 20 of the rear end of the nozzle 23. The pressure transducer 69 is located downstream of the control gap—thus, in FIGS. 6 and 7, the nozzle is machined to accommodate the pressure transducer as opposed to the pressure transducer being mounted in the manifold as in FIGS. 1–5.

FIG. 7 shows the valve pin in solid lines in the open position and Phantom dashed lines in the closed position. To restrict the melt flow and thereby reduce the melt pressure, the valve pin is moved forward from the open position towards surface 97 of the bore 20 of the nozzle which reduces the width of the control gap 98. To increase the flow of melt the valve pin is retracted to increase the size of the gap 98.

The rear 45 of the valve pin head 43 remains tapered at an angle from the stem 102 of the valve pin 41. Although the surface 45 performs no sealing function in this embodiment, it is still tapered from the stem to facilitate even melt flow and reduce dead spots.

As in FIGS. 1–5, pressure readings are fed back to the control system (CPU and PID controller), which can accordingly adjust the position of the valve pin 41 to follow a target pressure profile. The forward shut-off arrangement shown in FIGS. 6 and 7 also has the advantages of the embodiment shown in FIGS. 1–5 in that a large valve pin head 43 is used to create a long control gap 98 and a large control surface 97. As stated above, a longer control gap and greater control surface provides more precise control of the pressure and melt flow rate.

Figure 8:
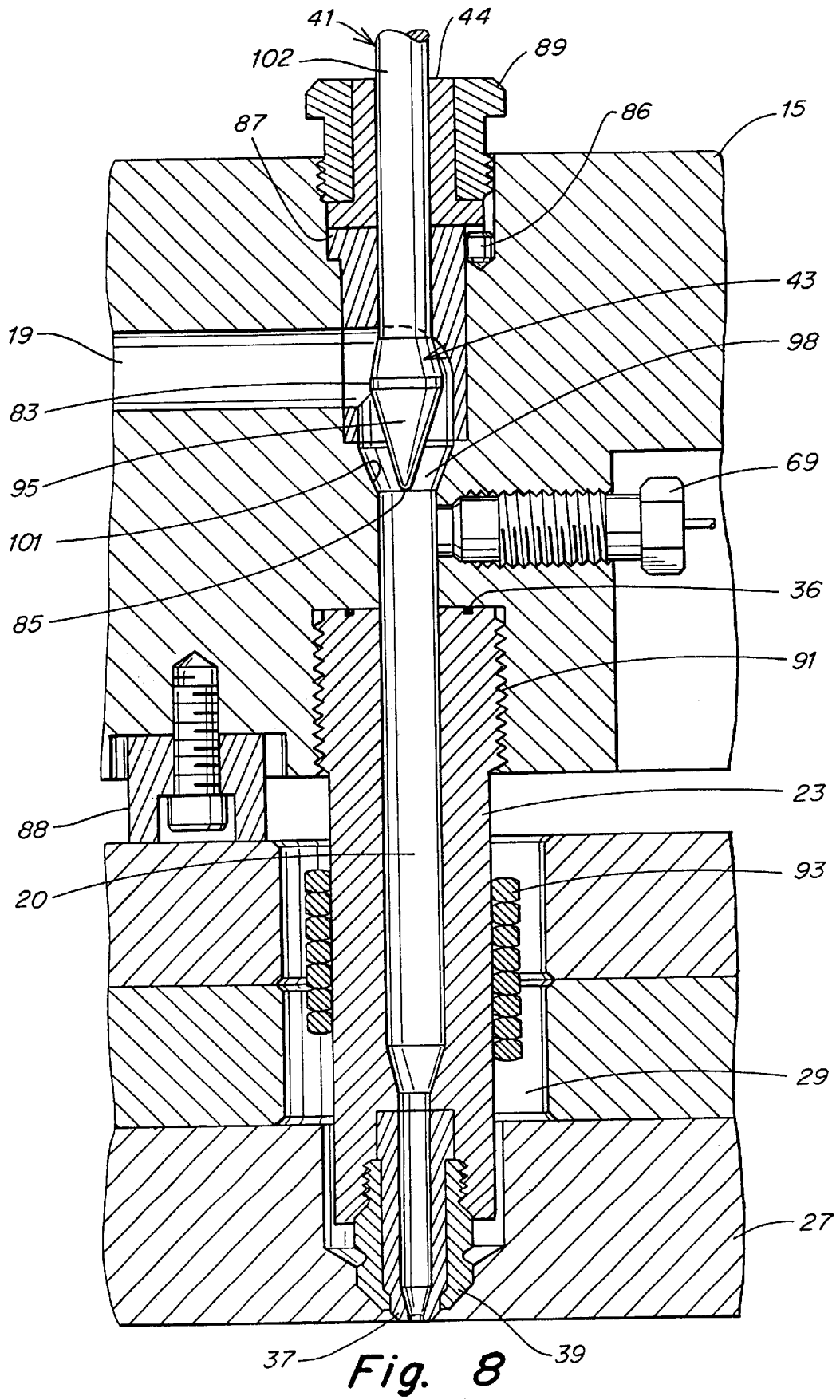
FIG. 8 is a cross-sectional view of an alternative embodiment of the present invention similar to FIG. 6, in which a threaded nozzle is used with a plug for easy removal of the valve pin.
Figure 9:
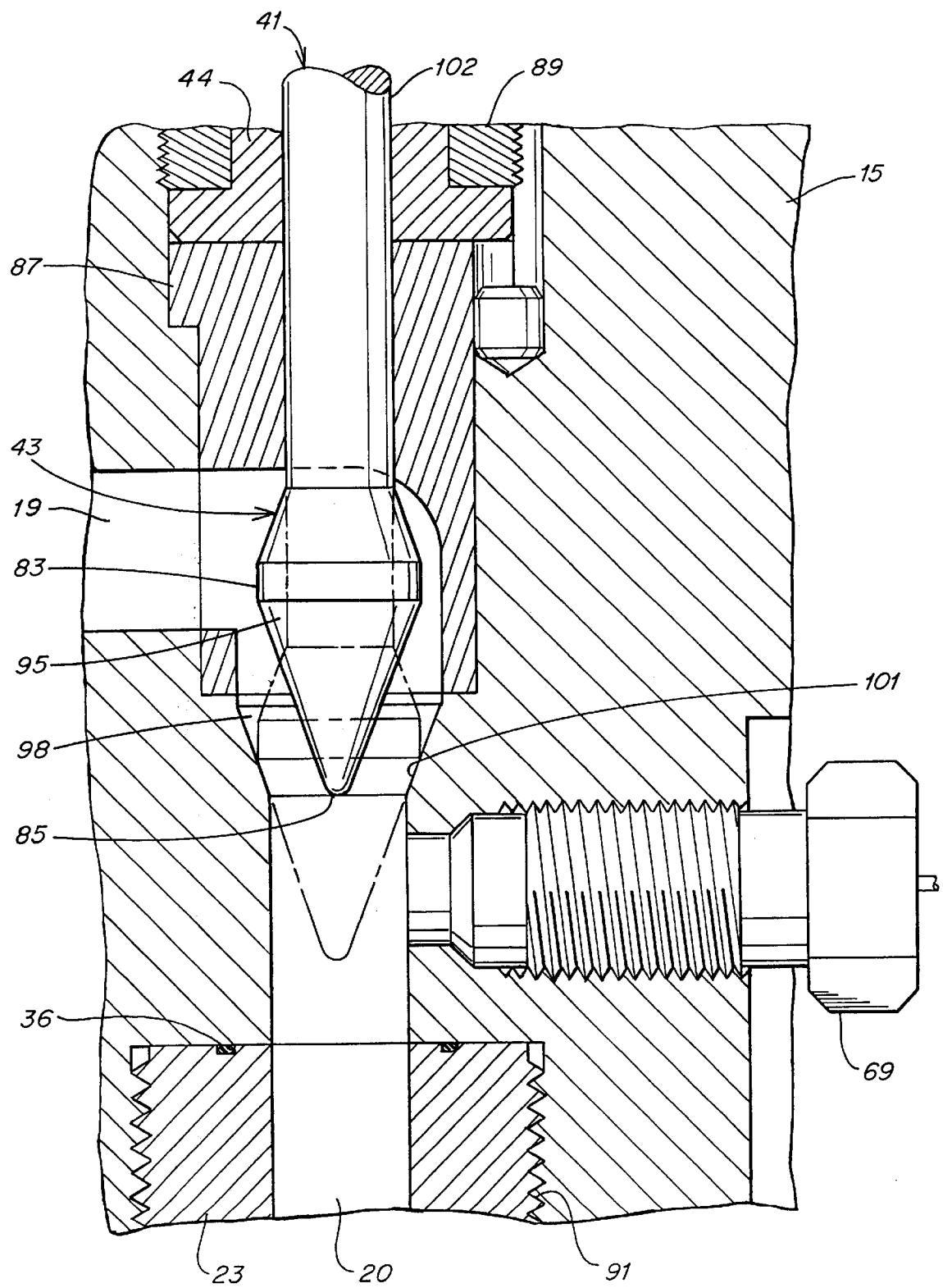
FIG. 9 is an enlarged fragmentary view of the embodiment of FIG. 8, in which the valve pin is shown in the open and closed positions.

FIGS. 8 and 9 show a forward shutoff arrangement similar to FIGS. 6 and 7, but instead of shutting off at the rear of the nozzle 23, the shut-off is located in the manifold at surface 101. Thus, in the embodiment shown in FIGS. 8 and 9, a conventional threaded nozzle 23 may be used with a manifold 15, since the manifold is machined to accommodate the pressure transducer 69 as in FIGS. 1–5. A spacer 88 is provided to insulate the manifold from the mold. This embodiment also includes a plug 87 for easy removal of the valve pin head 43.

Figure 10:
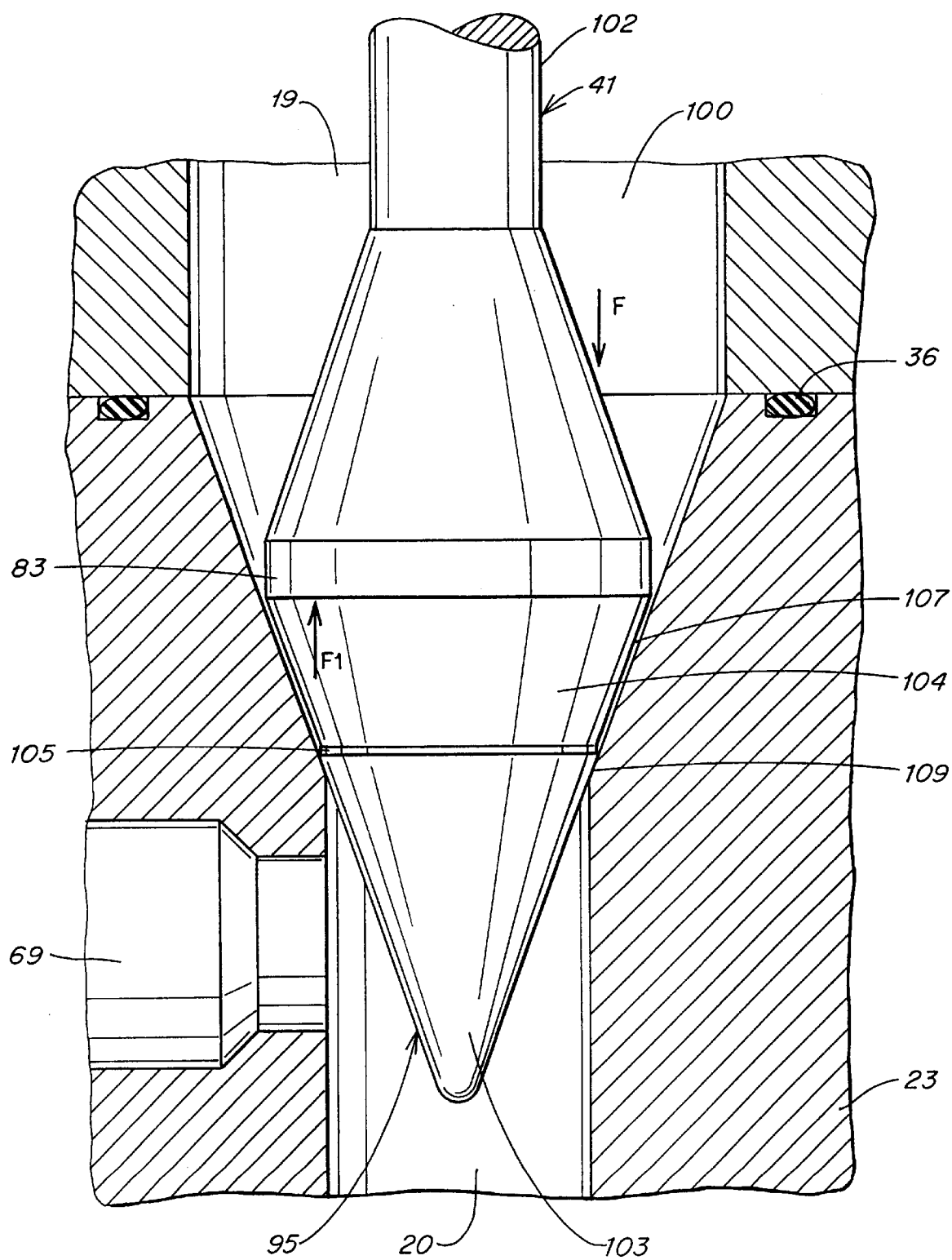
FIG. 10 is an enlarged view of an alternative embodiment of the valve pin, shown in the closed position.

FIG. 10 shows an alternative embodiment of the invention in which a forward shutoff valve pin head is shown as used in FIGS. 6–9. However, in this embodiment, the forward cone-shaped taper 95 on the valve pin includes a raised section 103 and a recessed section 104. Ridge 105 shows where the raised portion begins and the recessed section ends. Thus, a gap 107 remains between the bore 20 of the nozzle through which the melt flows and the surface of the valve pin head when the valve pin is in the closed position. Thus, a much smaller surface 109 is used to seal and close the valve pin. The gap 107 has the advantage in that it assists opening of the valve pin which is subjected to a substantial force F from the melt when the injection machine begins an injection cycle. When injection begins melt will flow into gap 107 and provide a force component F1 that assists the actuator in retracting and opening the valve pin. Thus, a smaller actuator, or the same actuator with less hydraulic pressure applied, can be used because it does not need to generate as much force in retracting the valve pin. Further, the stress forces on the head of the valve pin are reduced.

Despite the fact that the gap 107 performs no sealing function, its width is small enough to act as a control gap when the valve pin is open and correspondingly adjust the melt flow pressure with precision as in the embodiments of FIGS. 1–9.

Figure 11:
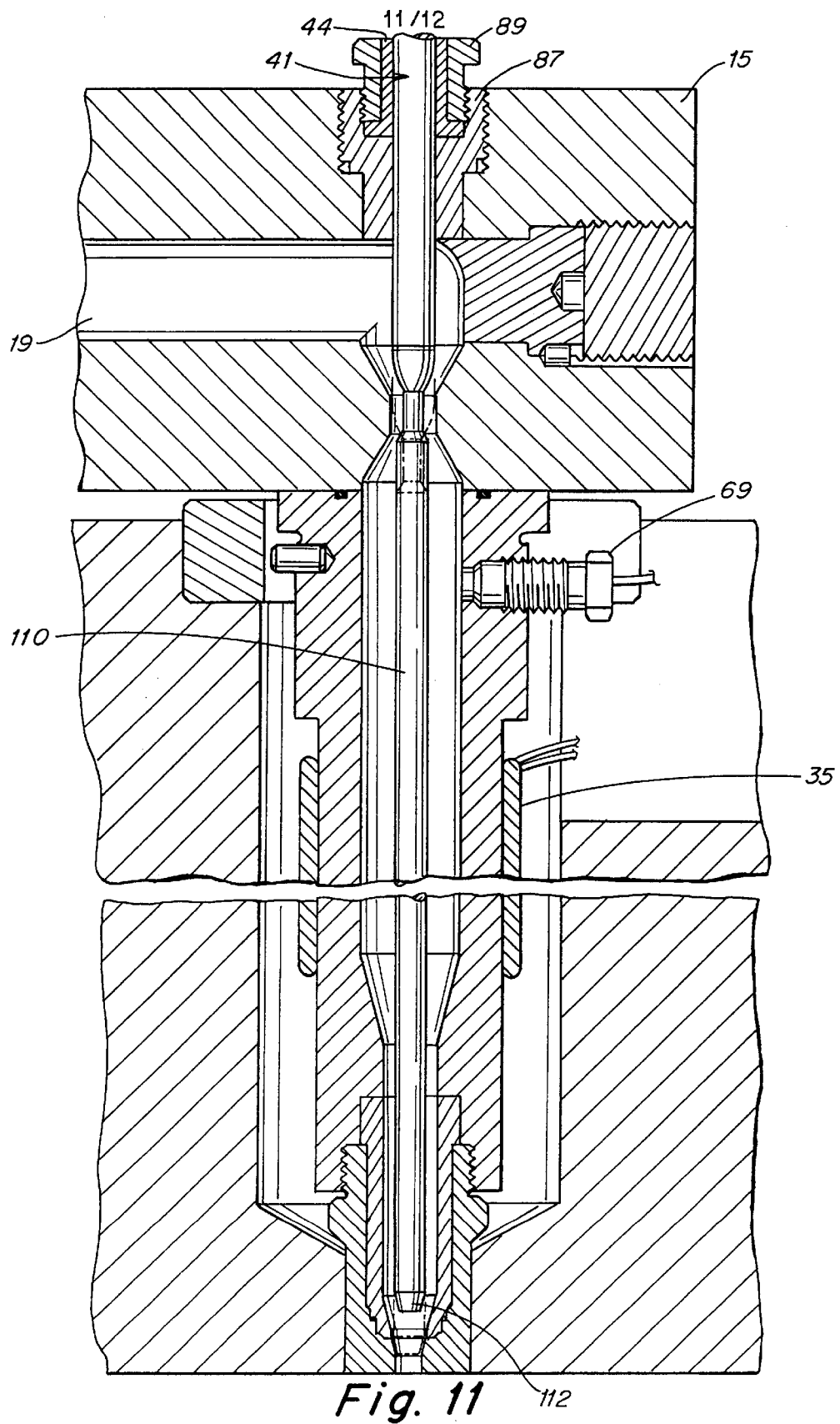
FIG. 11 is a fragmentary cross sectional view of an alternative embodiment of an injection molding system having flow control that includes a valve pin that extends to the gate.
Figure 12:
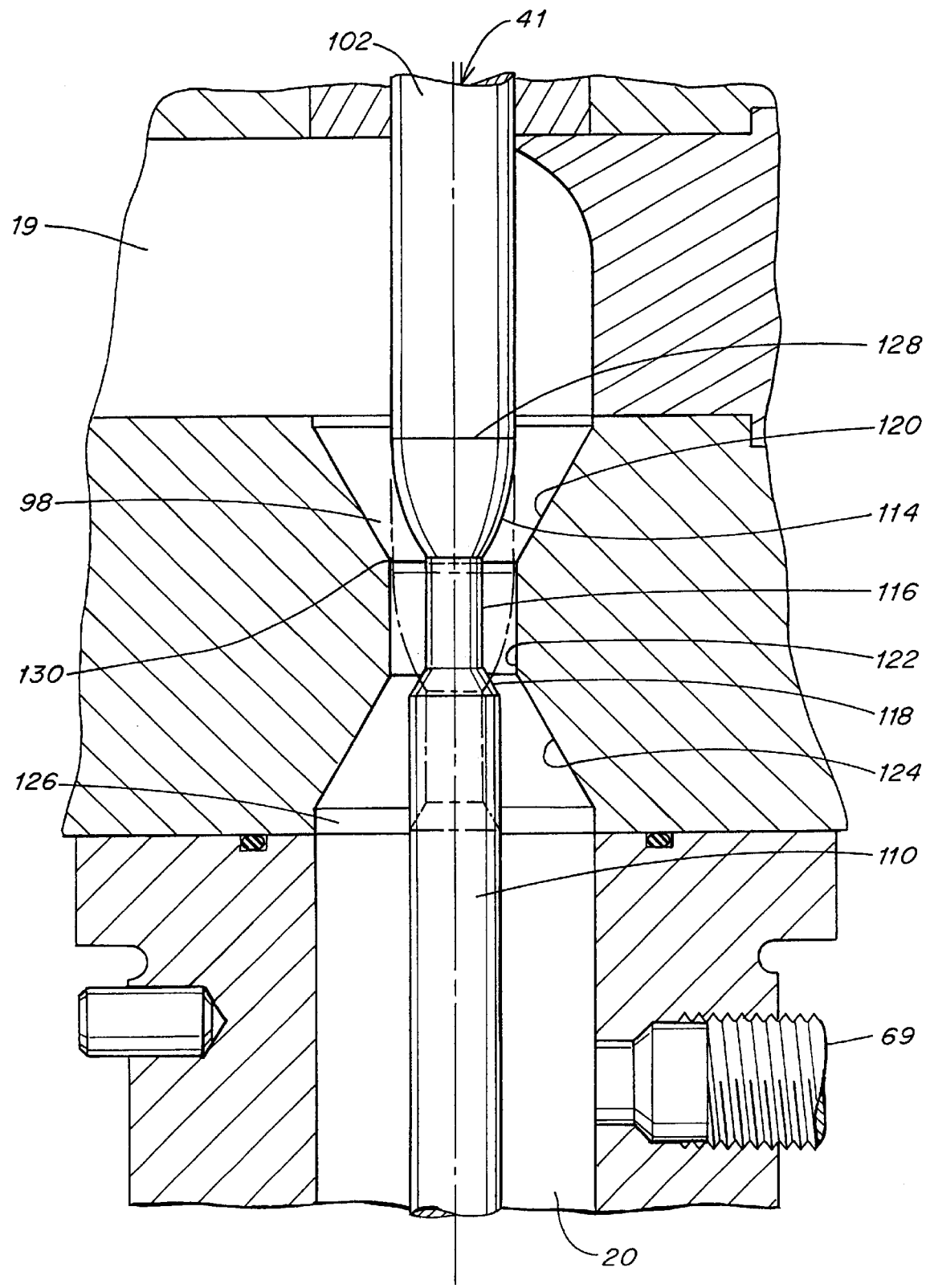
FIG. 12 is an enlarged fragmentary cross-sectional detail of the flow control area.

FIGS. 11 and 12 show an alternative hot-runner system having flow control in which the control of melt flow is still away from the gate as in previous embodiments. Use of the pressure transducer 69 and PID control system is the same as in previous embodiments. In this embodiment, however, the valve pin 41 extends past the area of flow control via extension 110 to the gate. The valve pin is shown in solid lines in the fully open position and in Phantom dashed lines in the closed position. In addition to the flow control advantages away from the gate described above, the extended valve pin has the advantage of shutting off flow at the gate with a tapered end 112 of the valve pin 41.

Extending the valve pin to close the gate has several advantages. First, it shortens injection cycle time. In previous embodiments thermal gating is used. In thermal gating, plastication does not begin until the part from the previous cycle is ejected from the cavity. This prevents material from exiting the gate when the part is being ejected. When using a valve pin, however, plastication can be performed simultaneously with the opening of the mold when the valve pin is closed, thus shortening cycle time by beginning plastication sooner. Using a valve pin can also result in a smoother gate surface on the part.

The flow control area is shown enlarged in FIG. 12. In solid lines the valve pin is shown in the fully open position in which maximum melt flow is permitted. The valve pin includes a convex surface 114 that tapers from edge 128 of the stem 102 of the valve pin 41 to a throat area 116 of reduced diameter. From throat area 116, the valve pin expands in diameter in section 118 to the extension 110 which extends in a uniform diameter to the tapered end of the valve pin.

In the flow control area the manifold includes a first section defined by a surface 120 that tapers to a section of reduced diameter defined by surface 122. From the section of reduced diameter the manifold channel then expands in diameter in a section defined by surface 124 to an outlet of the manifold 126 that communicates with the bore of the nozzle 20. FIGS. 11 and 12 show the support ring style nozzle similar to FIGS. 1–3. However, other types of nozzles may be used such as, for example, a threaded nozzle as shown in FIG. 8.

As stated above, the valve pin is shown in the fully opened position in solid lines. In FIG. 12, flow control is achieved and melt flow reduced by moving the valve pin 41 forward toward the gate thereby reducing the width of the control gap 98. Thus, surface 114 approaches surface 120 of the manifold to reduce the width of the control gap and reduce the rate of melt flow through the manifold to the gate.

To prevent melt flow from the manifold bore 19, and end the injection cycle, the valve pin is moved forward so that edge 128 of the valve pin, i.e., where the stem 102 meets the beginning of curved surface 114, will move past point 130 which is the beginning of surface 122 that defines the section of reduced diameter of the manifold bore 19. When edge 128 extends past point 130 of the manifold bore melt flow is prevented since the surface of the valve stem 102 seals with surface 122 of the manifold. The valve pin is shown in dashed lines where edge 128 is forward enough to form a seal with surface 122. At this position, however, the valve pin is not yet closed at the gate. To close the gate the valve pin moves further forward, with the surface of the stem 102 moving further along, and continuing to seal with, surface 122 of the manifold until the end 112 of the valve pin closes with the gate.

In this way, the valve pin does not need to be machined to close the gate and the flow bore 19 of the manifold simultaneously, since stem 102 forms a seal with surface 122 before the gate is closed. Further, because the valve pin is closed after the seal is formed in the manifold, the valve pin closure will not create any unwanted pressure spikes. Likewise, when the valve pin is opened at the gate, the end 112 of the valve pin will not interfere with melt flow, since once the valve pin is retracted enough to permit melt flow through gap 98, the valve pin end 112 is a predetermined distance from the gate. The valve pin can, for example, travel 6 mm. from the fully open position to where a seal is first created between stem 102 and surface 122, and another 6 mm. to close the gate. Thus, the valve pin would have 12 mm. of travel, 6 mm. for flow control, and 6 mm. with the flow prevented to close the gate. Of course, the invention is not limited to this range of travel for the valve pin, and other dimensions can be used.

Having thus described certain embodiments of the present invention, various alterations, modifications, and improvements will readily occur to those skilled in the art.

Such alterations, modifications, and improvements are intended to be within the spirit and scope of the invention. Accordingly, the foregoing description is by way of example only, and not intended to be limiting. The invention is limited only as defined in the following claims and the equivalents thereof.

What is claimed is:

1. An injection molding system comprising:
    a manifold adapted to receive material injected from an injection molding machine and distribute the material to a plurality of channels;
    a plurality of injection molding nozzles coupled to the manifold, each injection molding nozzle having a bore for passing material from one of said channels of the manifold to a respective gate of a respective separate mold cavity; and
    a controller to individually control respective rates at which material flows into each separate mold cavity during an injection cycle, wherein the controller controls the respective rates according to predetermined target profiles associated with each injection nozzle, each target profile being indicative of desired rate of material flow through the injection nozzle and into the cavity associated therewith during an injection cycle.

2. The system of claim 1, further comprising a plurality of valve pins respectively associated with each injection molding nozzle, wherein displacement of one of said valve pins during an injection cycle alters a rate of material flow into the respective mold cavity associated with that valve pin.

3. The system of claim 2, further comprising a plurality of sensors respectively associated with each injection molding nozzle, each sensor for sensing a condition indicative of a rate of material flow into each respective separate mold cavity.

4. The system of claim 3, wherein the controller is adapted to compare the condition sensed by each sensor to a target condition associated with that sensor and adjust a position of the respective valve pin associated therewith according to the comparison during an injection cycle.

5. The system of claim 4, wherein each sensor has a target profile associated therewith that indicates desired values of the sensed condition during the injection cycle.

6. The system of claim 5, wherein each target profile is stored in the controller.

7. The system of claim 2, wherein each valve pin includes a surface away from the gate associated therewith for forming a gap through which material passes, wherein each said gap is decreased when the valve pin associated therewith is retracted away from its gate to decrease the rate of material flow and increased when the valve pin associated therewith is displaced toward its gate to increase the rate of material flow.

8. The system of claim 3, wherein the sensed condition is material pressure.

9. The system of claim 2, wherein each valve pin includes a surface away from the gate associated therewith for forming a gap through which material passes, wherein each said gap is increased when the valve pin associated therewith is retracted away from its gate to increase the rate of material flow and decreased when the valve pin associated therewith is displaced toward its gate to decrease the rate of material flow.

10. The system of claim 1, wherein the separate mold cavities include cavities having different sizes or shapes.

11. The system of claim 1, wherein the separate mold cavities include cavities having a same size and shape.

12. The system of claim 1, further comprising a second plurality of injection molding nozzles coupled to the manifold, wherein each of said second plurality of injection molding nozzles includes a bore for passing material into one of said separate mold cavities such that at least two injection molding nozzles gate into each of said separate mold cavities.

13. The system of claim 1, wherein the rates of material flow are controlled in the manifold.

14. An injection molding system comprising:
a manifold adapted to receive material injected from an injection molding machine and distribute the material to a plurality of channels;
a plurality of injection molding nozzles coupled to the manifold, each injection molding nozzle having a bore for passing material from one of said channels of the manifold to a respective gate of a respective separate mold cavity; and
a controller to individually control respective rates at which material flows into each separate mold cavity during an injection cycle, wherein the controller controls each respective rate based on a single sensed condition indicative of the rate of material flow through each injection nozzle and into the cavity associated therewith.

15. The system of claim 14, wherein the controller controls the respective rates according to predetermined target profiles of the single sensed condition associated with each injection nozzle, each target profile being indicative of desired values of the single sensed condition during the injection cycle.

16. An injection molding system comprising:
a manifold adapted to receive material injected from an injection molding machine and distribute the material to a plurality of channels;
a plurality of injection molding nozzles coupled to the manifold, each injection molding nozzle having a bore for passing material from one of said channels of the manifold to a respective gate of a mold cavity; and
a controller to individually control respective rates at which material flows into the mold cavity during an injection cycle, wherein the controller controls the respective rates according to predetermined target profiles associated with each injection nozzle, each target profile being indicative of desired rate of material flow through the injection nozzle and into the cavity during an injection cycle.

* * * * *

UNITED STATES PATENT AND TRADEMARK OFFICE
CERTIFICATE OF CORRECTION

PATENT NO.    : 6,343,921 B1
DATED         : February 5, 2002
INVENTOR(S)   : David Kazmer and Mark D. Moss It is certified that error appears in the above-identified patent and that said Letters Patent is hereby corrected as shown below:

<u>Title page,</u>
Item [54], in the title, delete "USING SEPARATE CAVITIES".

Signed and Sealed this

Eighteenth Day of June, 2002

Attest:

Attesting Officer

JAMES E. ROGAN
*Director of the United States Patent and Trademark Office*